(12) United States Patent
Edrich et al.

(10) Patent No.: US 6,820,929 B2
(45) Date of Patent: Nov. 23, 2004

(54) VEHICLE SEAT HAVING AN ADJUSTABLE-TILT HEADREST

(75) Inventors: Hans Edrich, Heltersberg (DE);
Gerhard Flory, Boeblingen (DE);
Thomas Geisel, Rottenberg (DE);
Andreas Kinzer, Homburg (DE);
Ralf-Henning Schrom, Rottenburg (DE); Heiko Utsch, Keiserslautern (DE); Andreas Weingart, Niederkirchen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/379,173

(22) Filed: Mar. 4, 2003

(65) Prior Publication Data
US 2004/0026964 A1 Feb. 12, 2004

(30) Foreign Application Priority Data
Mar. 4, 2002 (DE) .......................................... 102 09 189

(51) Int. Cl.$^7$ ................................................. A47C 1/02
(52) U.S. Cl. ........................................ 297/61; 297/410
(58) Field of Search ..................... 297/61, 410, 408, 297/68, 84

(56) References Cited

U.S. PATENT DOCUMENTS

| | | | |
|---|---|---|---|
| 2,796,917 A | * 6/1957 | Luckhardt | .................. 297/322 |
| 3,929,374 A | * 12/1975 | Hogan et al. | .................. 297/61 |
| 4,668,014 A | 5/1987 | Boisset | |
| 4,923,250 A | * 5/1990 | Hattori | ........................ 297/410 |
| 5,015,031 A | * 5/1991 | Horenkamp | .................. 297/84 |
| 5,052,754 A | 10/1991 | Chinomi | |
| 5,288,129 A | 2/1994 | Nemoto | |
| 5,374,100 A | * 12/1994 | Rogers et al. | ................. 297/61 |
| 6,485,096 B1 | * 11/2002 | Azar et al. | ..................... 297/61 |

FOREIGN PATENT DOCUMENTS

| | | |
|---|---|---|
| DE | 29 25 781 | 1/1981 |
| DE | 31 16 208 | 11/1982 |
| DE | 40 09 127 | 10/1990 |
| DE | 44 07 519 | 9/1995 |
| DE | 196 44 021 | 5/1998 |
| DE | 198 51 698 | 5/2000 |
| DE | 299 22 592 U | 5/2000 |
| DE | 100 22 441 | 7/2001 |
| FR | 2 583 361 | 12/1986 |

\* cited by examiner

Primary Examiner—Milton Nelson, Jr.
(74) Attorney, Agent, or Firm—Kenyon & Kenyon

(57) ABSTRACT

A vehicle seat having a seat surface and a seatback is tiltable about a transversely extending pivot axis. The seatback is arranged to be tiltable from an upright seat position into a tilted resting position. In order to achieve a comfortable setting of the headrest in all seat positions and resting positions, the seatback has an automatically driven height adjustment apparatus and an automatically driven tilt adjustment apparatus, each positioned within the seatback.

12 Claims, 2 Drawing Sheets

VEHICLE SEAT HAVING AN ADJUSTABLE-TILT HEADREST

CROSS-REFERENCE TO RELATED APPLICATIONS

The present application claims priority to Application No. 102 09 189.7, filed in the Federal Republic of Germany on Mar. 4, 2002, which is expressly incorporated herein in its entirety by reference thereto.

FIELD OF THE INVENTION

The present invention relates a vehicle seat.

BACKGROUND INFORMATION

German Published Patent Application No. 196 44 021 describes a vertically adjustable headrest for a vehicle seat. The headrest has a cushion carrier that engages from above into the back of the vehicle seat and is adjustable vertically by an electric linear drive. It is disadvantageous here that the adjustment capability of the headrest is not sufficient to achieve comfortable support of the head in all seat positions.

German Published Patent Application No. 31 16 208 describes a surgical chair having a headrest, the position of which is manually adjustable. The operation of this adjustment apparatus is very complex. Adjustment of the headrest can be performed only with difficulty by the seat occupant alone.

German Published Patent Application No. 100 22 441 describes a seatback for a vehicle seat having a so-called active headrest. The headrest height can be set manually. By a two-armed lever positioned in the seatback, in the event of a rear-end crash the headrest is accelerated toward the occupant's head because the seat occupant's body presses on the lever. This headrest as well is insufficiently adjustable, so that comfortable head support is not ensured.

It is an object of the present invention to provide a vehicle seat, having an adjustable seatback, which has a headrest that may ensure comfortable and secure head support in every possible seat position, may have a compact configuration, and may be as easy as possible to operate.

SUMMARY

The above and other beneficial objects of the present invention may be achieved by providing a vehicle seat as described herein.

In an example embodiment, the vehicle seat has a height adjustment apparatus and a tilt adjustment apparatus. By the height adjustment apparatus, the height of the headrest is set in preselectable fashion so that good head support may be ensured for short and tall persons. In addition, the vehicle seat has a tilt adjustment apparatus that sets and/or modifies the tilt of the headrest and/or the spacing of the headrest from the seat occupant. The tilt adjustment apparatus is automatically driven and may be controlled such that the headrest may be moved into a freely preselectable position. To ensure a maximally compact and, in particular, robust arrangement of the tilt adjustment apparatus, the latter may be positioned in integrated fashion in the seatback. The tilt adjustment apparatus is joined to a cushion carrier of the headrest and acts on the latter to pivot the headrest about a pivot axis located in the seatback and extending transversely, so that the tilt adjustment apparatus modifies and/or adapts the spacing of the headrest from the seat occupant.

The placement of the pivot axis in the seatback may be selected so that upon adjustment of the headrest tilt, no vertical motion relative to the head may occur. The pivot axis may be positioned in a region corresponding approximately to the rotation point of head when sitting up into the reading position. Optimum adjustment of the headrest may thereby be achieved. Especially in the case of a vehicle seat having a pivotable backrest that may be pivoted between an upright seat position and a tilted reclining position, it is possible to ensure an optimum and/or comfortable setting of the headrest for all possible seat positions. With the seatback pivoted back, it is possible for the seat occupant to assume a resting position and for the headrest also to pivot back correspondingly. It is also possible, with the seatback pivoted back, to assume a relaxed reading position by swinging the headrest farther forward. Comfortable head support may therefore be guaranteed in every seat position, and the seat occupant may relax his or her neck muscles.

For convenient operation, provision may be made for the height adjustment device and/or tilt adjustment device to have a drive motor, e.g., an electric or pneumatic drive motor, etc. A preselected position may be easily arrived at, and/or a pleasant seating position for the seat occupant may be established, by activating the tilt adjustment device and/or height adjustment device, for example, by pressing a button.

An example embodiment provides for the height adjustment device to have a slide that may be moved up and down by a drive motor in the seatback. The slide may be arranged to retain the headrest cushion carrier by having a receptacle into which the cushion carrier of the headrest may be inserted, e.g., may be snap-locked, from above. The height of the headrest is thus varied as the slide moves up and/or down.

An example embodiment provides for the height adjustment apparatus to be mounted on the tilt adjustment apparatus, e.g., for the height adjustment apparatus to be joined by the tilt adjustment apparatus to a part of the seatback frame or to the seatback frame itself. In order to modify the tilt and/or the position of the headrest, the tilt adjustment apparatus pivots the height adjustment apparatus about a pivot axis. Since the headrest and the cushion are mounted on the height adjustment apparatus, the tilt adjustment apparatus acts indirectly, via the height adjustment apparatus, on the headrest in order to adjust the tilt and/or position.

The placement of the tilt adjustment apparatus and the height adjustment apparatus in the seatback may provide that the headrest may be adjusted with very little noise. In addition, the tilt adjustment apparatus and/or the height adjustment apparatus may have low-noise drives, e.g., an electric geared motor or spindle drive, etc., in each case, in order to ensure low-noise adjustment of the headrest.

It may be possible to use the vehicle seat according to the present invention in passenger cars, in buses, and in watercraft or rail vehicles, etc. Use of the vehicle seat according to the present invention as a comfortable passenger seat in aircraft is also provided.

Further features and example embodiments of the present invention are described below with reference to the Figures. The features and feature combinations described above and described below are usable not only in the particular combination indicated but also in other combinations or in isolation, without departing from the scope of the present invention.

Further example embodiments of the present invention are illustrated in and explained with reference to the Figures.

DETAILED DESCRIPTION

Figure 1:
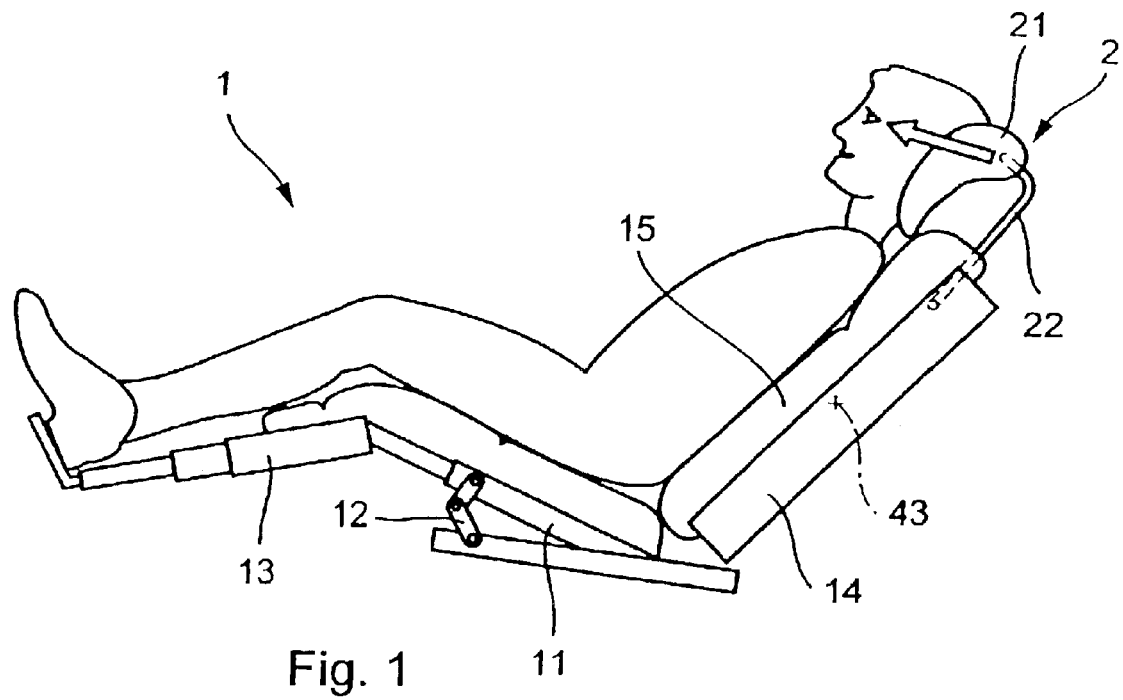
FIG. 1 illustrates a vehicle seat having a tilted seatback, with the headrest in the resting position.

FIG. 1 illustrates a vehicle seat 1 with a person at rest. The vehicle seat is arranged as an adjustable vehicle seat with an upright seat position, as is usual with a conventional vehicle seat, and an adjustable resting position. It has a backrest 14 having a cushion 15, a seat cushion 11, and a footrest 13. A headrest 2 is positioned at the upper end of seatback 14. In the resting position illustrated in FIG. 1, footrest 13 is raised as compared with an upright seat position, so that the seat occupant may conveniently rest his or her feet on footrest 13. Seat cushion 11 is adjustable as to tilt by a seat cushion adjuster 12, so that seat cushion 11 constitutes a seat surface with adjustable tilt.

Backrest 14 is pivotable about a pivot axis extending transversely to the seat surface, so that a more-upright or a more-reclined seat position may be selected.

Headrest 2 positioned at the upper end of seatback 14 has a cushion carrier 22 and a head cushion 21. The head cushion is shaped such that it may constitute an optimum support for the back of the seat occupant's head and his or her neck. The headrest thus may ensure planar support of the head. Cushion carrier 22 retains the head cushion by a joint positioned in the upper region of head cushion 21, so that the position of head cushion 21 relative to cushion carrier 22 is adjustable.

Figure 2:
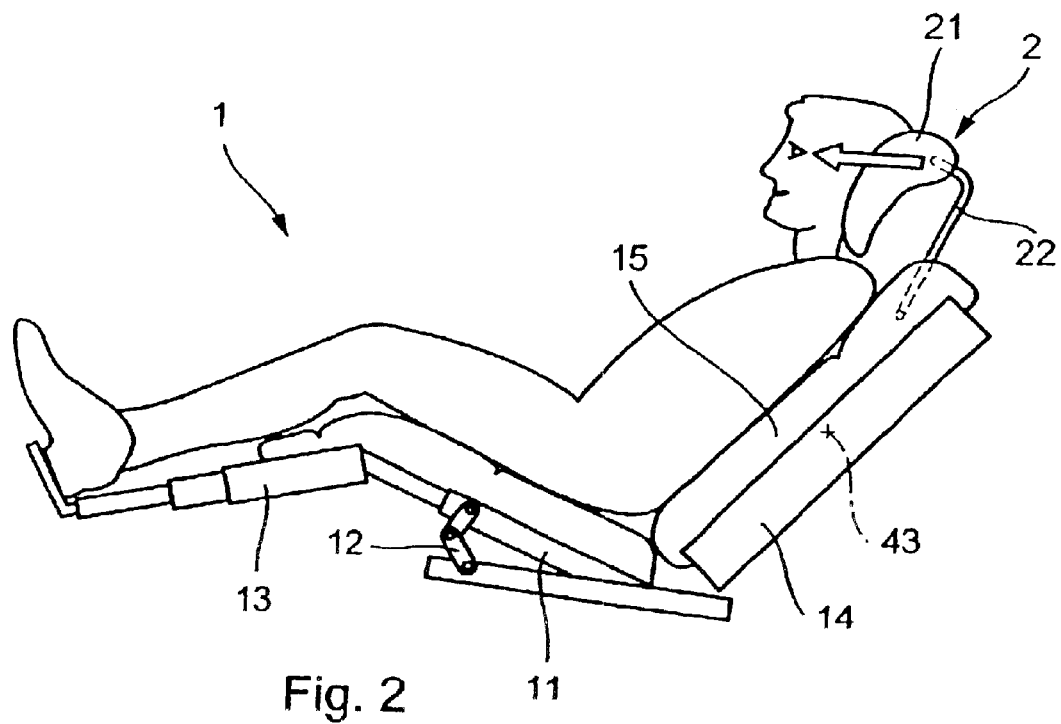
FIG. 2 illustrates a vehicle seat having a tilted seatback, with the headrest in the reading position.

Cushion carrier 22 is pivotable, by a tilt adjustment apparatus 4, about a pivot axis 43 positioned in seatback 14. The seat occupant may thus move from the resting position illustrated in FIG. 1 into a more-upright reading position illustrated in FIG. 2. Pivot axis 43 is positioned in the seatback in the region of the rotation point about which the seat occupant's head rotates while sitting up. No motion is therefore performed relative to the head as a result of the pivoting of headrest 2, and support may be optimal not only in the end positions but also in every intermediate position of cushion carrier 22.

Figure 3:
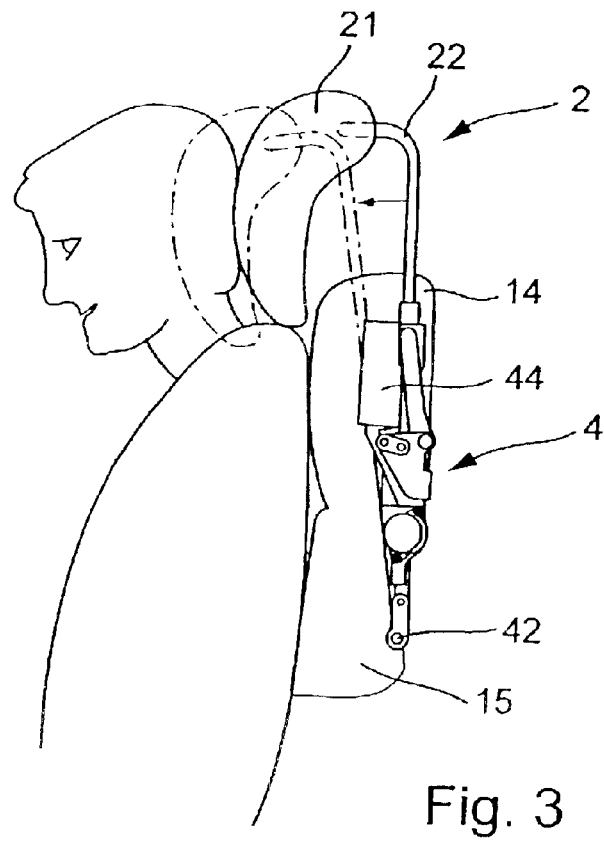
FIG. 3 is a side view of the seatback with the tilt adjustment apparatus.

FIG. 3 is a cross-sectional side view through seatback 14. Cushion carrier 22 of headrest 2 engages from above through openings 16 into seatback 14 and is mounted in tilt adjustment apparatus 4. The latter is received entirely in the interior of seatback 14, cushion 15 of the seatback serving for sound insulation. Tilt adjustment apparatus 4 is mounted on frame 17 of seatback 14 by pivot bearings 42.

Figure 4:
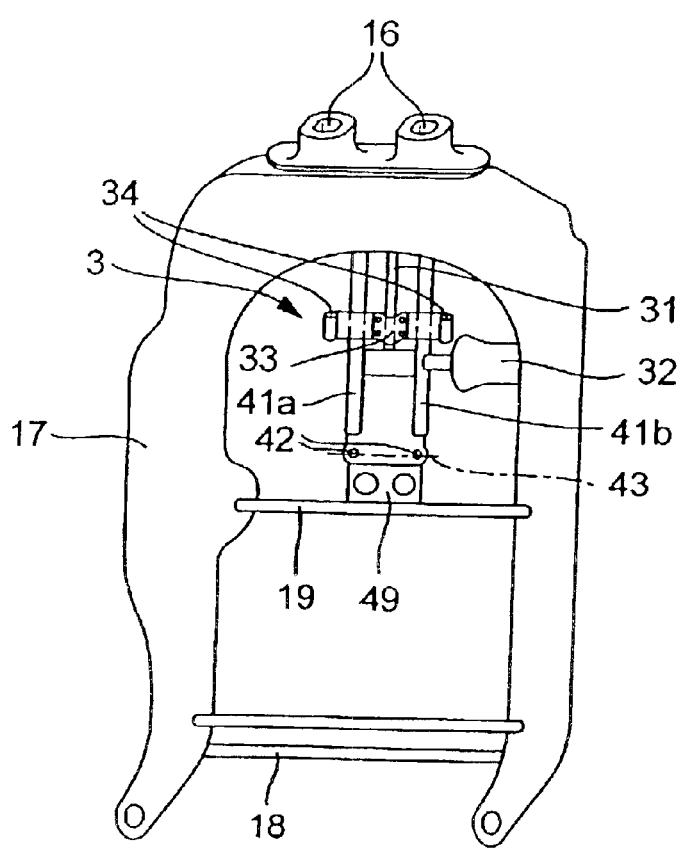
FIG. 4 schematically illustrates the frame of the seatback.

A geared electric motor 44 engages between seatback frame 17 and tilt adjustment apparatus 4 and pivots the latter about pivot axis 43, as also illustrated in FIG. 4, where frame 17 of seatback 14 is illustrated in perspective along with tilt adjustment device 4 and height adjustment device 3. Seatback frame 17 is U-shaped, and has centeredly positioned and end-located crossmembers 18, 19 for reinforcement. Positioned at the upper end of the seatback frame is a housing having openings 16 in which drive motor 44 of tilt adjustment apparatus 4 is received. Tilt adjustment apparatus 4 has two tubes 41a, 41b positioned in parallel. One end of each of these tubes 41a, 41b is mounted by a respective rotary bearing 42, indirectly via a spacer 49, on center crossmember 19 of seatback frame 17. The other end of tube extends into the housing positioned at the top of the seatback frame, and is joined there to the respective other tube via of a coupler. Drive motor 44 acts via a linkage and a toothed segment on the coupler, for simultaneous and parallel pivoting of the two tubes 41a and 41b. The pivot angle of tubes 41a, 41b is limited by stops.

Pivot axis 43 of the headrest extends through pivot bearings 42 and is defined by their placement. Spacer 49 determines the spacing of pivot bearings 42 from center crossmember 19 and thus the location of pivot axis 43 within seatback 14. By modifying the spacer, the location of pivot axis 43 may be varied and/or adapted to seatback frame 17 such that the pivot axis approximately coincides with the natural rotation point of the head while sitting up.

Height adjustment device 3 is mounted on tubes 41a, 41b such that as tubes 41a and 41b pivot, height adjustment device 3 is also pivoted. A slide 33 of height adjustment device 3 is guided in longitudinally displaceable fashion on the tubes. Slide 33 is automatically moved up or down by a threaded spindle 31 that is driven by a drive motor 32. This spindle drive is self-locking, so that the position arrived at by height adjustment device 3 is automatically held.

Slide 33 has two receptacles 34 into which the rod assembly of cushion carrier 22 may be inserted from above. Receptacles 34 snap-lock releasably to cushion carrier 22 so that the latter is held securely in slide 33 and, together with the latter, may be moved up and down and/or may be pivoted by tilt adjustment apparatus 4.

What is claimed is:

1. A vehicle seat, comprising:
    a seat surface;
    a seatback pivotable about an axis extending transversely to the seat surface;
    a height adjustment device; and
    a headrest vertically adjustable by the height adjustment device and including a head cushion carrier engaging from above through an opening into the seatback and a head cushion;
    wherein the seatback includes an automatically driven tilt adjustment apparatus configured to adjust the headrest into a freely preselectable position, the tilt adjustment apparatus arranged within the seatback and configured to pivot the head cushion carrier about a pivot axis positioned in the seatback and extending transversely to the seat surface.

2. The vehicle seat according to claim 1, wherein the seatback is pivotable from an upright seat position to a tilted resting position.

3. The vehicle seat according to claim 1, wherein the height adjustment device is arranged within the seatback and includes one of an electric and a pneumatic drive motor configured to adjust a height of the headrest.

4. The vehicle seat according to claim 1, wherein the tilt adjustment apparatus is arranged to retain the height adjustment device.

5. The vehicle seat according to claim 1, wherein the tilt adjustment apparatus includes one of an electric drive motor and a pneumatic drive motor.

6. The vehicle seat according to claim 1, wherein the tilt adjustment apparatus includes two tubes arranged in the seatback, each tube including a pivot bearing arranged at one end and joined to a frame of the seatback.

7. The vehicle seat according to claim 6, wherein the pivot bearings provide a location of the pivot axis of the headrest.

8. The vehicle seat according to claim 7, wherein the pivot bearings are joined to the frame of the seatback by a spacer, the spacer configured to vary the location of the pivot axis.

9. The vehicle seat according to claim 6, wherein the tubes linearly displaceably receive a slide of the height adjustment device and are positioned so that the slide is moveable at least one of up and down by a drive motor to adjust a headrest height relative to the seatback.

10. The vehicle seat according to claim 6, wherein a drive motor of the tilt adjustment apparatus is configured to engage between the seatback frame and the tubes to pivot the tubes.

11. The vehicle seat according to claim 1, wherein the height adjustment device includes a drive motor and a slide, the drive motor configured to drive the slide to adjust a height of the headrest via a linkage and a threaded spindle.

12. The vehicle seat according to claim 11, wherein the slide includes a receiving apparatus configured to retain the cushion carrier.

* * * * *